July 23, 1963 I. MOCKRIN ETAL 3,098,752
FLUOALUMINATE COMPOSITION AS DIELECTRIC MATERIAL
Filed April 12, 1961
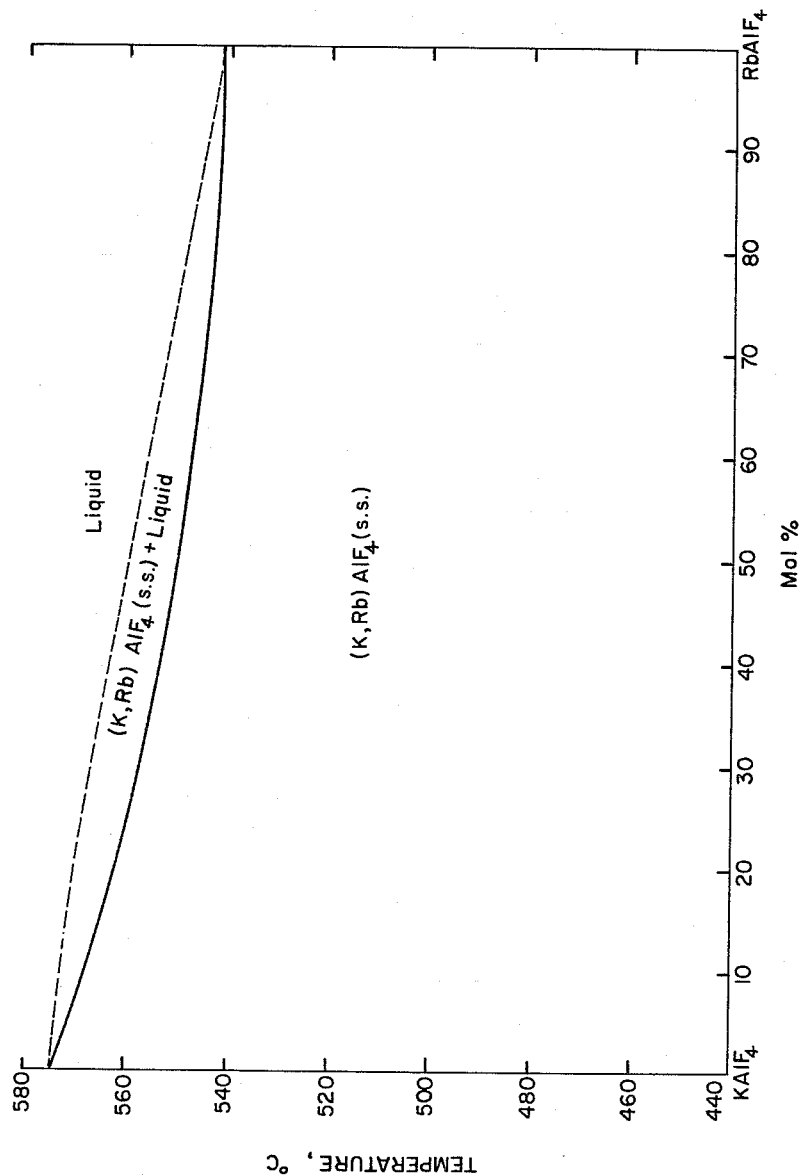
INVENTORS.
ALEXANDER KOWALSKI
ISADORE MOCKRIN
BY
Paul Lipsitz
AGENT 3,098,752
FLUOALUMINATE COMPOSITION AS
DIELECTRIC MATERIAL
Isadore Mockrin, Plymouth Meeting, and Alexander Kowalski, Levittown, Pa., assignors to Pennsalt Chemicals Corporation, Philadelphia, Pa., a corporation of Pennsylvania
Filed Apr. 12, 1961, Ser. No. 102,518
5 Claims. (Cl. 106—39)

This invention relates to a novel composition comprised of certain fluoaluminates and their use as novel dielectric materials. More particularly, the invention deals with the use of solid solutions comprising potassium and rubidium tetrafluoaluminates as solid dielectrics.

A dielectric or insulating material may be characterized roughly as having an electrical conductivity less than $10^{-6}$ mhos./cm. Important dielectrics include mica, barium titanate, various ceramics, paper and impregnated papers, numerous plastics and the like. Muscovite, $K_4Al_{12}Si_{12}O_{40}(OH)_8$, and phlogopite, $$K_4Mg_{12}Al_4Si_{12}O_{40}(OH)_8$$

are the two natural forms of mica used as dielectrics. 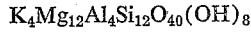 Synthetic mica, phlogopite in which F has replaced the OH group, is also used to some extent. Such characteristics as high dielectric strength, low power-factor losses, flexibility, transparency and perfect cleavage make mica usable in many industries.

Sheet mica is a vital material both in peace and wartime for the electronic and electrical industries. Unfortunately, the United States has been virtually dependent on foreign sources for high-quality sheet mica. India is the principal source of muscovite sheet mica. Brazil is also an important exporter of high-quality muscovite block to the United States. The United States' supply of phlogopite is obtained almost entirely from Madagascar and Canada.

Research on synthetic mica, or fluorine-phlogopite, has resulted in a commercially feasible method for manufacture, but only relatively small crystals are generally obtained, so that synthetic mica is not a substitute for sheet mica. However, synthetic mica is used in such applications as glass-bonded mica ceramics and hot-pressed machinable dielectrics (see for example, the disclosure of U.S. 2,675,853). Thus, there still remains the need for a readily available sheet dielectric material.

In the application of I. Mockrin, Serial No. 39,726, filed June 29, 1960, there is described the use of potassium or rubidium tetrafluoaluminates as dielectric materials. These fluoaluminates may be obtained in a layer structure form providing cleavable sheets similar to natural mica. Only these alkali metal tetrafluoaluminates are mica-like in properties; cesium tetrafluoaluminate, for example, is not a sheet-like material. NaAlF$_4$ and LiAlF$_4$, on the other hand, are not stable at room temperature and their preparation requires a vapor phase reaction at very high temperatures which is difficult.

It has been observed when working with potassium and rubidium tetrafluoaluminates that KAlF$_4$ forms less brittle and larger crystalline sheets than does RbAlF$_4$. On the other hand, RbAlF$_4$ forms "books" of crystals which cleave more readily than KAlF$_4$. Furthermore, it has been observed that at low temperatures (about $-20°$ C.), KAlF$_4$ undergoes a transition which results in deterioration of the desirable sheet structure.

It has now been found that by means of this invention the transition temperature can be greatly lowered and that the novel products of the invention often have cleavage properties superior to either of the individual components. These desirable results are obtained by providing as a novel composition, a solid solution of KAlF$_4$ and RbAlF$_4$.

The novel composition of this invention includes all solid solutions of KAlF$_4$ and RbAlF$_4$, but it will be preferred to employ as dielectrics those solid solutions containing at least about 2 mole percent of RbAlF$_4$ because at this level the transition temperature is significantly lowered. The preferred upper limit of RbAlF$_4$ content will be about 90 mole percent, since a greater amount of RbAlF$_4$ in the composition reduces crystal flexibility. From a practical standpoint, however, solid solutions containing between about 2 and about 50 mole percent will be preferred. The products containing about equimolar amounts of RbAlF$_4$ and KAlF$_4$ appear to have the optimum cleavage properties.

The novel dielectric compositions of this invention are readily obtained by slowly cooling a melt of KAlF$_4$ and RbAlF$_4$, thus permitting sheet-like crystals to form. No elaborate controls are required, it merely being necessary to fuse the potassium and rubidium tetrafluoroaluminate mixture and allow cooling to room temperature to occur. Reference is made to the drawing which illustrates the phase diagram for the KAlF$_4$—RbAlF$_4$ system. This diagram clearly illustrates the fusion temperatures and the melting point range for the system and thus is a guide to fusion temperatures for any desired composition. On cooling the melt, the resulting material contains "books" of sheet-like crystals of varying size which after removal are split and used in the manner normally applied to mica.

The nature of the mechanics of crystallization from this type of solid solution as shown in the drawing is described and discussed on page 11 in the book "Phase Diagrams for Ceramists," by E. M. Levin, H. F. McMurdie, and F. H. Hall (The American Ceramic Society, 1956).

The fluoaluminate materials (e.g., KAlF$_4$ and RbAlF$_4$) are prepared readily according to the method of Brosset (Z. Anorg. Chem., 235 139–147 (1937) and 239, 301–304 (1938)) which involves simply the evaporation to dryness of a mixture of (1) an aqeuous hydrogen fluoride solution of a hydrated alumina (e.g., gibbsite), and (2) the alkali metal (i.e., potassium or rubidium) fluoride.

As indicated, these novel fluoaluminate compositions are solid solutions, by which is meant that the lattice structure of neither fluoaluminate constituent is evident in X-ray patterns, but that a composite, single-phase lattice, intermediate between that of the two constituents is observed. The crystalline sheets of this solid solution are transparent, have excellent cleavage properties and in addition show no transition even when cooled to liquid nitrogen temperature ($-196°$ C.).

The following examples will serve to further illustrate the invention:

EXAMPLE 1

A 45 g. mixture composed of approximately 50 mole percent of $KAlF_4$ and 50 mole percent of $RbAlF_4$ was prepared and fused in a muffle furnace at 650° C. for one hour. Then the mass was allowed to cool slowly to room temperature. The "books" of crystalline sheets were removed and were found to cleave very readily, being better than either $KAlF_4$ or $RbAlF_4$ alone. Crystals immersed in liquid nitrogen showed no change, whereas crystals of $KAlF_4$ deteriorated.

EXAMPLE 2

*Thermal Data for Low-Temperature Inversion*

The low-temperature "inversion" was studied by differential thermal analysis (DTA). The furnace and sample holder for this low-temperature DTA consists of a Dewar flask thoroughly chilled with liquid nitrogen prior to the run and a silver sample block on which is wound a resistance winding of insulated wire connected to 110 v. A. C. with a variable voltage transformer. The rate of heating depends on the current applied (up to 1 amp.). Cooling curves were run and then heating curves. The former yielded exothermic peaks and the latter endothermic peaks; this is characteristic of inversions.

The following table illustrates the improvement obtained by this invention with respect to the low temperature inversion effect. It is clear from the table that the solid solutions of this invention show the transition at temperatures much below that for $KAlF_4$ alone.

TABLE I

| Composition: | Temperature of transition on cooling, ° C. |
|---|---|
| $KAlF_4$ | −23 |
| $KAlF_4$—99 mole percent<br>$RbAlF_4$—1 mole percent | −39 |
| $KAlF_4$—95 mole percent<br>$RbAlF_4$—5 mole percent | Below −196 |

EXAMPLE 3

Crystals of various thicknesses from various molar ratios of $KAlF_4$—$RbAlF_4$ solid solutions were used as the dielectric of a capacitor.

Dielectric measurements were accomplished by use of a General Radio Capacitance Bridge, Model 716–C, for the frequencies 100 c.p.s., 1 kc. and 10 kc. For measurement at 100 kc. and higher, a Boonton Q Meter was used.

The test sample was a capacitor consisting of two electrodes separated by a solid spacer which spacer was the fluoaluminate sheet. The capacitor was prepared either (a) by vacuum depositing gold or (b) by applying a silver paint to the opposite flat faces of the fluoaluminate sheet and drying at 200° C. for 30 minutes, thus leaving the silver metal as electrodes.

Dielectric strength values were determined on crystal pieces with non-coated or with sliver coated samples. The sample in the former case was held between point contacts immersed in an oil bath. The rate of loading, in accordance with an ASTM standard, was step-wise at 500 volts/minute, 60 cycles until failure. Since the dielectric strength is expressed as volts/unit thickness, the determination of the thickness of the piece investigated is required.

A micrometer measurement of the thickness gives a value which does not reflect localized variations of thickness. Therefore, it was considered more meaningful to first conduct the experiment until failure and subsequently measure the thickness in the immediate vicinity of failure by optical methods. A microscope at a 230 magnification was used. The vertical adjustment of the focal point by a micrometer screw calibrated in microns permits the measurement of thickness in the vicinity of breakdown. The true thickness of the sample is then the linear distance between a focus on the upper and lower crystal surfaces multiplied by the index of refraction. The index of refraction of these materials was assumed to be about 1.4 which is representative of crystalline inorganic fluorine containing materials.

Both the above methods have been utilized for thickness measurements; however, for the purposes of determination of dielectric strength, the latter optical method is deemed preferable. In general, the test procedures of ASTM designation D 150–54T were followed.

The data given in the following table represent values obtained in the above tests when using the more physically perfect fluoaluminate samples, having a general absence of cracks, striations and other imperfections.

TABLE II

| Sample (Melt Composition) | Frequency | Loss Factor Tan $\gamma \times 10^4$ | Capacitance, $\mu\mu f.$ | Dielectric Constant K |
|---|---|---|---|---|
| 10 mol percent $RbAlF_4$; 90 mol percent $KAlF_4$. Thickness=0.08 mm. | 100 c.p.s. | 177.5 | 19.0 | 10.23 |
| | 1 kc. | 56.0 | 18.7 | 10.07 |
| | 10 kc. | 24.8 | 18.5 | 9.98 |
| | 1 mc. | 12.44 | 17.6 | 9.45 |
| | 3 mc. | 11.44 | 17.5 | 9.45 |
| 25 mol percent $RbAlF_4$; 75 mol percent $KAlF_4$. Thickness=0.10 mm. | 100 c.p.s. | 71.25 | 14.70 | 10.13 |
| | 1 kc. | 30.8 | 14.60 | 10.07 |
| | 10 kc. | 19.6 | 14.55 | 10.03 |
| | 1 mc. | 36.5 | 13.03 | 8.97 |
| | 3 mc. | 39.2 | 13.04 | 8.97 |
| 50 mol percent $RbAlF_4$; 50 mol percent $KAlF_4$. Thickness=0.10 mm. | 100 c.p.s. | 47.8 | 9.40 | 8.13 |
| | 1 kc. | 17.64 | 9.35 | 8.09 |
| | 10 kc. | 16.92 | 9.30 | 8.05 |
| | 1 mc. | 44.5 | 9.18 | 7.94 |
| | 3 mc. | 61.9 | 8.67 | 7.50 |
| 75 mol percent $RbAlF_4$; 25 mol percent $KAlF_4$. Thickness=0.09 mm. | 100 c.p.s. | 10.67 | 15.45 | 9.32 |
| | 1 kc. | 13.58 | 15.45 | 9.32 |
| | 10 kc. | 20.50 | 15.35 | 9.32 |
| | 1 mc. | 120.6 | 14.74 | 8.87 |
| | 3 mc. | 124.0 | 14.27 | 8.60 |

The following table illustrates the dielectric strength properties of the compositions of the invention.

TABLE III

| Sample (Melt Composition) Mol percent $RbAlF_4$/Mol percent $KAlF_4$ | Sample Thickness (inches × $10^3$) | Total Volts 60 c.p.s. | Volts/Mil |
|---|---|---|---|
| 10/90 | 1.54 | 7,000 | 4,540 |
| | 1.875 | 6,000 | 3,200 |
| | 2.28 | 7,000 | 3,070 |
| | 1.46 | 5,500 | 3,770 |
| | 2.12 | 8,000 | 3,790 |
| Average | | | 3,674 |
| 25/75 | 2.48 | 4,500 | 1,815 |
| | 2.80 | 4,000 | 1,428 |
| | 3.68 | 4,500 | 1,225 |
| | 4.20 | 5,500 | 1,310 |
| | 4.16 | 5,500 | 1,325 |
| Average | | | 1,421 |
| 50/50 | 2.16 | 6,500 | 3,050 |
| | 2.16 | 5,500 | 2,550 |
| | 2.16 | 6,500 | 3,050 |
| Average | | | 2,883 |
| 75/25 | 3.94 | 6,200 | 1,575 |
| | 3.94 | 9,500 | 2,410 |
| | 3.94 | 8,500 | 2,160 |
| | 3.94 | 5,000 | 1,270 |
| | 3.94 | 9,000 | 2,285 |
| | 3.94 | 9,000 | 2,285 |
| Average | | | 1,997 |

It will be evident from the above data that the dielectric strength properties do not appear to vary with the composition of the solid solutions of this invention. However, there does appear to be a tendency toward the same thickness effect reported with muscovite mica in that the greatest dielectric strength is obtained with the thinnest samples. As stated above, however, the significant improvements obtained with the solid solution compositions of this invention are in improved low temperature transition properties and in improved cleavability.

The samples of the solid solution of potassium and rubidium fluoaluminates used in the above evaluations were single crystals as obtained from the melts. However, it is also possible to hot press small pieces of the fluoaluminate composition as is done with synthetic mica according to the process of U.S. 2,675,853.

It will be understood that capacitors may be made by techniques other than painting on or vacuum plating metal electrodes. For example, metal foils of aluminum, copper, and other electrically conducting materials may be used as the electrodes which are separated by the dielectric spacer. The fluoaluminate compositions are employed as is mica in conventional manufacturing techniques and U.S. Patents 1,345,754; 1,952,580; and 2,522,713 are illustrative of methods which may be used to make capacitors containing the fluoaluminate dielectric.

In addition to using the novel fluoaluminate compositions of this invention in a capacitor as demonstrated above, they may be used in other electric and electronic applications. For example, they may be used as electrode supports in vacuum tubes, in automated electronic manufactured articles employing wafer dielectrics for micromodule systems, in motor armature insulation, in high-voltage generator insulation in the form of tape fabricated from flakes of the fluoaluminate bonded to a backing, as dielectric insulators in switches, microswitches, relays, transformers, wires and cables, coaxial cables, and the like and in many electrical applications where dielectrics are generally used. In addition, they may be employed in place of glass as a binder for natural and synthetic mica used in pressed dielectrics. In this application they will have the advantage of supplementing the dielectric properties of the mica rather than adversely affecting the dielectric properties of the mica as does glass.

Many changes will be obvious to the skilled artisan and may be made from the above description of the invention without departing from its spirit and scope.

We claim:

1. As a novel composition useful as a dielectric, a solid solution consisting of $KAlF_4$ and $RbAlF_4$.

2. As a novel composition useful as a dielectric, a solid solution consisting of $KAlF_4$ and $RbAlF_4$ wherein the $RbAlF_4$ content is from about 2 to about 50 mole percent.

3. Articles of manufacture containing an electrical conductor insulated with a solid dielectric wherein said dielectric is a crystalline solid solution consisting of $KAlF_4$ and $RbAlF_4$ wherein the $RbAlF_4$ content is from about 2 to about 50 mole percent.

4. An electric capacitor comprising a sealed container, a pair of metal electrodes and a solid spacer therebetween, said spacer comprising a crystalline solid solution consisting of $KAlF_4$ and $RbAlF_4$ wherein the $RbAlF_4$ content is from about 2 to about 50 moles percent.

5. In the process of manufacturing articles containing a solid dielectric to separate conducting elements, the improvement which comprises the step of separating said conducting elements with a dielectric consisting of a crystalline fluoaluminate which is a solid solution consisting of $KAlF_4$ and $RbAlF_4$ wherein the $RbAlF_4$ content is from about 2 to about 50 mole percent.

References Cited in the file of this patent

UNITED STATES PATENTS 3,016,480     Mockrin _____ Jan. 9, 1962